(12) United States Patent
Yoshino et al.

(10) Patent No.: US 8,249,786 B2
(45) Date of Patent: Aug. 21, 2012

(54) CONTROL APPARATUS AND METHOD FOR AUTOMATIC TRANSMISSION

(75) Inventors: Jun Yoshino, Fuji (JP); Masaya Kubota, Fuji (JP)

(73) Assignee: JATCO Ltd, Fuji-shi (JP)

( * ) Notice: Subject to any disclaimer, the term of this patent is extended or adjusted under 35 U.S.C. 154(b) by 475 days.

(21) Appl. No.: 12/534,346

(22) Filed: Aug. 3, 2009

(65) Prior Publication Data

US 2010/0057314 A1  Mar. 4, 2010

(30) Foreign Application Priority Data

Sep. 3, 2008  (JP) ................ 2008-225799

(51) Int. Cl.
*G06F 19/00* (2011.01)

(52) U.S. Cl. .......................... 701/55; 701/51

(58) Field of Classification Search ............ 701/55, 701/51, 62, 64, 95; 475/269, 118, 125, 121, 475/128; 477/143, 144, 115, 121, 34, 120, 477/65, 153, 154, 156, 162, 169, 37, 174, 477/175; 192/3.31
See application file for complete search history.

(56) References Cited

U.S. PATENT DOCUMENTS

| | | | |
|---|---|---|---|
| 5,620,390 A | 4/1997 | Kono et al. | |
| 6,024,674 A | 2/2000 | Sato et al. | |
| 6,623,404 B2 * | 9/2003 | Saito | 477/143 |
| 6,997,843 B2 * | 2/2006 | Saitou | 475/269 |
| 7,935,016 B2 * | 5/2011 | Kawaguchi et al. | 475/118 |
| 7,962,267 B2 * | 6/2011 | Honma et al. | 701/51 |

FOREIGN PATENT DOCUMENTS

JP  10-159872 A  6/1998

* cited by examiner

*Primary Examiner* — Thomas G. Black
*Assistant Examiner* — Marthe Marc-Coleman
(74) *Attorney, Agent, or Firm* — Foley & Lardner LLP

(57) ABSTRACT

A control apparatus for an automatic transmission includes a shift control section configured to perform a shift of the automatic transmission; and a judder judging section. The shift control section is configured to judge whether or not a progress of the shift is during an inertia phase. The judder judging section calculates a characteristic-gradient index value which is a value obtained by quantifying a phenomenon that appears as a relative rotational speed between input and output of the first friction-engagement element becomes reduced with a progress of the inertia phase. The phenomenon appears in a different way in dependence upon whether a relational characteristic of a friction coefficient of the first friction-engagement element with respect to the relative rotational speed is a positive-gradient characteristic or a negative-gradient characteristic. The judder judging section determines that the judder has occurred based on the characteristic-gradient index value.

15 Claims, 8 Drawing Sheets

| | B1<br>Fr/B | C1<br>I/C | C2<br>D/C | C3<br>H&LR/C | B2<br>LOW/B | B3<br>2346/B | B4<br>R/B | F1 | F2 |
|---|---|---|---|---|---|---|---|---|---|
| 1ST | (O) | | | (O) | O | | | O | O |
| 2ND | | | | (O) | O | O | | | O |
| 3RD | | | O | | O | O | | | |
| 4TH | | | O | O | | O | | | |
| 5TH | | O | O | O | | | | | |
| 6TH | | O | | O | | O | | | |
| 7TH | O | O | | O | | | O | | |
| REV. | O | | | O | | | O | | |

|      | B1 Fr/B | C1 I/C | C2 D/C | C3 H&LR/C | B2 LOW/B | B3 2346/B | B4 R/B | F1 | F2 |
|------|---------|--------|--------|-----------|----------|-----------|--------|----|----|
| 1ST  | (○)     |        |        | (○)       | ○        |           |        | ○  | ○  |
| 2ND  |         |        |        | (○)       | ○        | ○         |        |    | ○  |
| 3RD  |         |        | ○      |           | ○        | ○         |        |    |    |
| 4TH  |         |        | ○      | ○         |          | ○         |        |    |    |
| 5TH  |         | ○      | ○      | ○         |          |           |        |    |    |
| 6TH  |         | ○      |        | ○         |          | ○         |        |    |    |
| 7TH  | ○       | ○      |        | ○         |          |           |        | ○  |    |
| REV. | ○       |        |        | ○         |          |           | ○      |    |    |

FIG.9
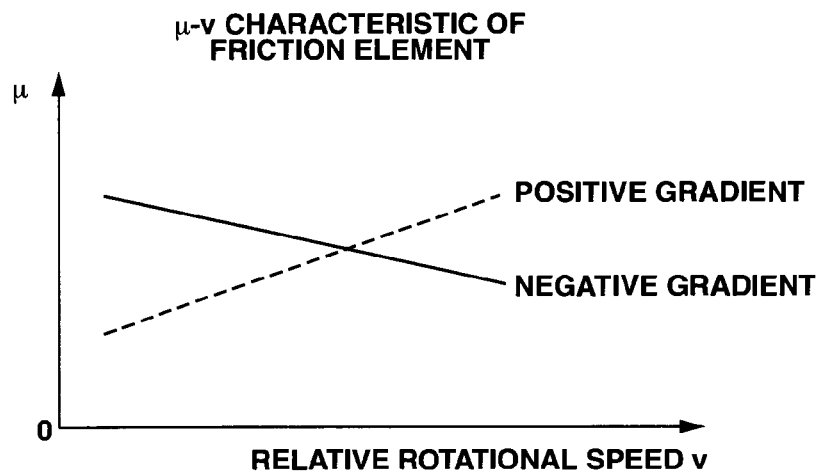
μ-v CHARACTERISTIC OF FRICTION ELEMENT
FIG.10A
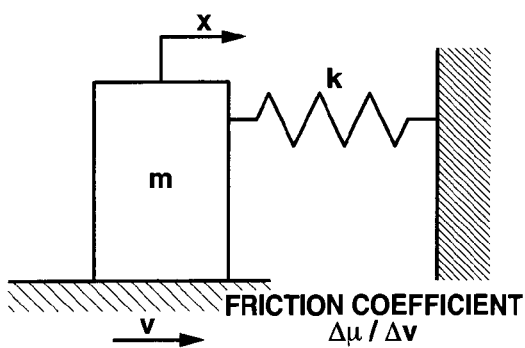
FIG.10B
$$m\ddot{x} + \boxed{mg \frac{\Delta\mu}{\Delta v}} + kx = 0$$
m: MASS
k: SPRING CONSTANT
Δμ / Δv: FRICTION COEFFICIENT
x: DISPLACEMENT
g: GRAVITATIONAL ACCELERATION

CONTROL APPARATUS AND METHOD FOR AUTOMATIC TRANSMISSION

BACKGROUND OF THE INVENTION

The present invention relates to a control apparatus and method for an automatic transmission, capable of judging an occurrence of judder due to self-excited vibration.

U.S. Pat. No. 6,024,674 (Japanese Patent Application publication No. 10-159872) discloses a previously proposed control apparatus equipped with a judder judging means for judging an occurrence of judder due to self-excited vibration. In this technique, a fluctuation in an output-shaft rotational speed of a friction clutch is detected. Then, on the basis of a frequency component (first or second frequency component) obtained by applying a filtering process to this rotational fluctuation, it is judged whether this rotational fluctuation is due to the self-excited vibration (judder) or due to a disturbance.

SUMMARY OF THE INVENTION

However, in the above technique, calculations (rotational fluctuation→waveform conversion→frequency calculation) for producing the frequency component need to be carried out in real time in order to judge the occurrence of judder. Hence, there is a problem that a calculation load of CPU (i.e., calculating section) is increased.

Moreover, in order to judge the judder; new structural components (e.g., rotational-fluctuation detecting means, waveform converting means, filtering means) need to be added, and an analysis of frequency component needs to be carried out. Hence, there is a problem that a structure of the apparatus is complicated in order to judge the judder.

It is therefore an object of the present invention to provide control apparatus and method for an automatic transmission, devised to accurately judge the occurrence of judder dependent on a μ-v characteristic of friction-engagement element without incurring the complication of structure and the increase of calculation load.

According to one aspect of the present invention, there is provided a control apparatus for an automatic transmission, comprising: a shift control section configured to perform a shift of the automatic transmission by engaging a first friction-engagement element which is in a released state, and by releasing a second friction-engagement element which is in an engaged state; and a judder judging section configured to judge an occurrence of a judder due to self-excited vibration; the shift control section including an inertia-phase determining section configured to judge whether or not a progress of the shift is during an inertia phase, the inertia phase being one of phases each representing a degree of the shift progress under a shift control, an input speed of the automatic transmission being varied for the inertia phase; the judder judging section being configured to calculate a characteristic-gradient index value, the characteristic-gradient index value being a value obtained by quantifying a phenomenon that appears as a relative rotational speed of input and output of the first friction-engagement element becomes reduced with a progress of the inertia phase, the phenomenon appearing in a different way in dependence upon whether a relational characteristic of a friction coefficient of the first friction-engagement element with respect to the relative rotational speed is a positive-gradient characteristic or a negative-gradient characteristic, and to determine that the judder has occurred, when the characteristic-gradient index value indicates that the phenomenon has appeared due to the negative-gradient characteristic.

According to another aspect of the present invention, there is provided a control apparatus for an automatic transmission, comprising: shift control means for performing a shift of the automatic transmission by engaging a first friction-engagement element which is in a released state, and by releasing a second friction-engagement element which is in an engaged state; and judder judging means for judging an occurrence of a judder due to self-excited vibration; the shift control means including means for judging whether or not a progress of the shift is during an inertia phase, the inertia phase being one of phases each representing a degree of the shift progress under a shift control, an input speed of the automatic transmission being varied for the inertia phase; the judder judging means including means for calculating a characteristic-gradient index value, the characteristic-gradient index value being a value obtained by quantifying a phenomenon that appears as a relative rotational speed of input and output of the first friction-engagement element becomes reduced with a progress of the inertia phase, the phenomenon appearing in a different way in dependence upon whether a relational characteristic of a friction coefficient of the first friction-engagement element with respect to the relative rotational speed is a positive-gradient characteristic or a negative-gradient characteristic, and means for determining that the judder has occurred, when the characteristic-gradient index value indicates that the phenomenon has appeared due to the negative-gradient characteristic.

According to still another aspect of the present invention, there is provided a control method for an automatic transmission, comprising: performing a shift of transmission ratio by engaging a first friction-engagement element which is in a released state, and by releasing a second friction-engagement element which is in an engaged state; and judging an occurrence of a judder due to self-excited vibration, by operations of: judging whether or not a progress of the shift is during an inertia phase, the inertia phase being one of phases each representing a degree of the shift progress under a shift control, an input speed of the automatic transmission being varied for the inertia phase; calculating a characteristic-gradient index value, the characteristic-gradient index value being a value obtained by quantifying a phenomenon that appears as a relative rotational speed of input and output of the first friction-engagement element becomes reduced with a progress of the inertia phase, the phenomenon appearing in a different way in dependence upon whether a relational characteristic of a friction coefficient of the first friction-engagement element with respect to the relative rotational speed is a positive-gradient characteristic or a negative-gradient characteristic; and determining that the judder has occurred, when the characteristic-gradient index value indicates that the phenomenon has appeared due to the negative-gradient characteristic.

The other objects and features of this invention will become understood from the following description with reference to the accompanying drawings.

BRIEF DESCRIPTION OF DRAWINGS

FIG. 9 is a view showing $\mu$-v characteristics of friction elements having positive and negative gradients.

FIG. 10A is an explanatory view showing a simplified vibration model for a vibration of friction element.

FIG. 10B is an explanatory view showing an equation of motion for the vibration of friction element.

DETAILED DESCRIPTION OF THE INVENTION

Figure 1:
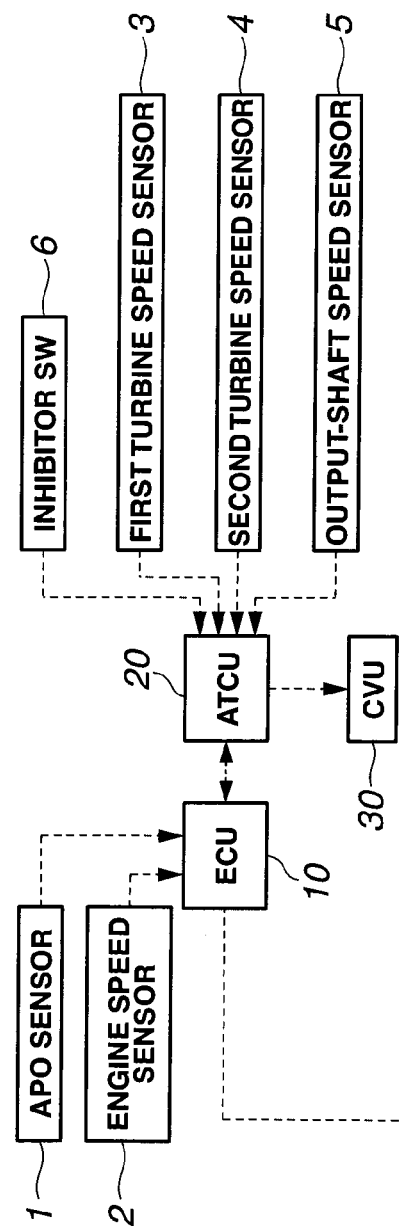
FIG. 1 is a skeleton diagram showing one example of an automatic transmission to which a control apparatus is applied in a first embodiment according to the present invention.
Figure 1:
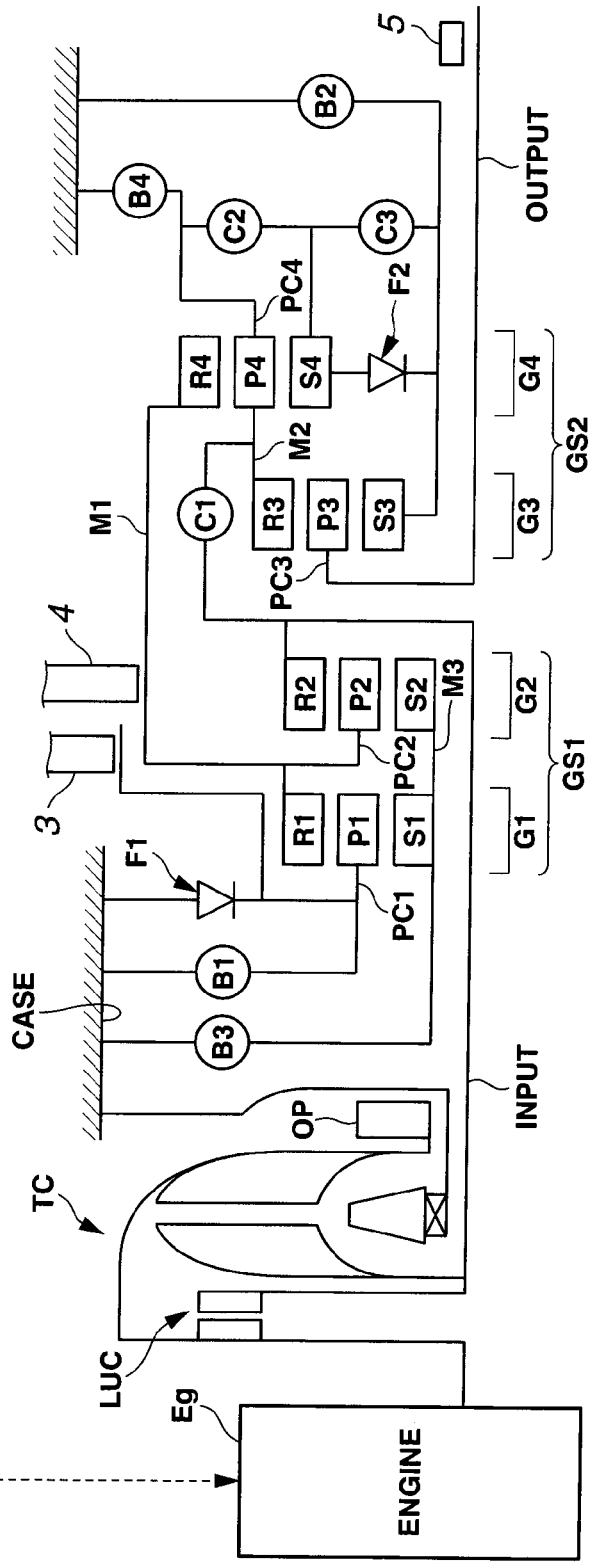

Reference will hereinafter be made to the drawings in order to facilitate a better understanding of the present invention.

First Embodiment

A first embodiment of an automatic transmission control apparatus according to the present invention will be explained referring to the drawings.

At first, a configuration of the control apparatus in the first embodiment is now be explained. FIG. 1 is a skeleton diagram showing one example of an automatic transmission to which the control apparatus according to the present invention is applied in the first embodiment. The automatic transmission in the first embodiment is a step automatic transmission having forward seven speeds (transmission ratios, i.e., shift steps) and reverse one speed. The automatic transmission includes an input shaft INPUT, four planetary gear mechanisms, seven friction-engagement elements and an output shaft OUTPUT. The automatic transmission receives a driving force of the engine EG from the input shaft INPUT through a torque converter TC. A rotational speed of the input shaft INPUT is changed by the four planetary gear mechanisms and the seven friction-engagement elements, and is outputted from the output shaft OUTPUT. Moreover, an oil pump OP is provided coaxially to a pump impeller of the torque converter TC, and is drivingly rotated by the driving force of engine EG so as to pressurize oil.

Moreover, the control apparatus includes an engine controller (ECU) 10, an automatic-transmission controller (ATCU) 20 and a control valve unit (CVU) 30. The engine controller 10 controls a drive state of the engine EG. The automatic-transmission controller 20 controls a shift state and the like of the automatic transmission. The control valve unit 30 controls a hydraulic pressure (oil pressure) of each friction-engagement element on the basis of output signals of the automatic-transmission controller 20. The engine controller 10 is connected or communicated with the automatic-transmission controller 20 through a CAN-communication line or the like. Thereby, sensor information, control information and the like are shared between the engine controller 10 and the automatic-transmission controller 20 via communication.

The engine controller 10 is connected with an accelerator opening sensor 1 for sensing an accelerator-pedal manipulated variable (operation amount) of a driver, and an engine speed sensor 2 for sensing a rotational speed of the engine EG. The engine controller 10 controls a fuel injection quantity and a throttle opening on the basis of the engine rotational speed and the accelerator-pedal manipulated variable, so that an output rotational speed of the engine EG and an engine torque are controlled.

The automatic-transmission controller 20 is connected with a first turbine speed sensor 3, a second turbine speed sensor 4, an output-shaft speed sensor 5 and an inhibitor switch 6. The first turbine speed sensor 3 serves to sense a rotational speed of a first carrier PC1. The second turbine speed sensor 4 serves to sense a rotational speed of a first ring gear R1. The output-shaft speed sensor 5 serves to sense a rotational speed of the output shaft OUTPUT. The inhibitor switch 6 serves to sense a range position of a shift lever which is selected by the driver. When a D-range (DRIVE range) is being selected; the automatic-transmission controller 20 selects an optimum command transmission-ratio (gear ratio of whole of the transmission, i.e., shift step) based on a vehicle speed Vsp and an accelerator opening APO representing the accelerator-pedal manipulated variable, and outputs a control command for achieving the command transmission-ratio, to the control valve unit 30.

Next, a shift gear mechanism between the input shaft INPUT and the output shaft OUTPUT is now be explained. On an axis from the side of the input shaft INPUT to the side of the output shaft OUTPUT, a first planetary gear mechanism G1, a second planetary gear mechanism G2, a third planetary gear mechanism G3 and a fourth planetary gear mechanism G4 are arranged in this order. The first planetary gear mechanism G1 and the second planetary gear mechanism G2 constitute a first planetary gear set GS1. The third planetary gear mechanism G3 and the fourth planetary gear mechanism G4 constitute a second planetary gear set GS2. Moreover, a first clutch C1, a second clutch C2, a third clutch C3, a first brake B1, a second brake B2, a third brake B3 and a fourth brake B4 are provided as the friction-engagement elements. Moreover, there are provided a first one-way clutch F1 and a second one-way clutch F2.

The first planetary gear mechanism G1 is of single-pinion type. The first planetary gear mechanism G1 includes a first sun gear S1, the first ring gear R1, and the first carrier PC1 supporting a first pinion P1. The first pinion P1 engages or meshes with both gears S1 and R1.

The second planetary gear mechanism G2 is of single-pinion type. The second planetary gear mechanism G2 includes a second sun gear S2, a second ring gear R2, and a second carrier PC2 supporting a second pinion P2. The second pinion P2 engages or meshes with both gears S2 and R2.

The third planetary gear mechanism G3 is of single-pinion type. The third planetary gear mechanism G3 includes a third sun gear S3, a third ring gear R3, and a third carrier PC3 supporting a third pinion P3. The third pinion P3 engages or meshes with both gears S3 and R3.

The fourth planetary gear mechanism G4 is of single-pinion type. The fourth planetary gear mechanism G4 includes a fourth sun gear S4, a fourth ring gear R4, and a fourth carrier PC4 supporting a fourth pinion P4. The fourth pinion P4 engages or meshes with both gears S4 and R4.

The input shaft INPUT is connected with the second ring gear R2, so that a rotational driving force is inputted from the engine EG through the torque converter TC and the like to the second ring gear R2. The output shaft OUT is connected with the third carrier PC3, so that an output rotational driving force is transmitted through a final gear and the like to drive roadwheels.

The first ring gear R1, the second carrier PC2 and the fourth ring gear R4 are integrally connected with one another by a first connecting member M1. The third ring gear R3 is integrally connected with the fourth carrier PC4 by a second connecting member M2. The first sun gear S1 is integrally connected with the second sun gear S2 by a third connecting member M3.

The first planetary gear set GS1 includes four rotation elements since the first planetary gear mechanism G1 is connected with the second planetary gear mechanism G2 by means of the first connecting member M1 and the third connecting member M3, as shown in FIG. 1. Moreover, the second planetary gear set GS2 includes five rotation elements since the third planetary gear mechanism G3 is connected with the fourth planetary gear mechanism G4 by means of the second connecting member M2.

In the first planetary gear set GS1, torque is inputted from the input shaft INPUT to the second ring gear R2, and is outputted through the first connecting member M1 to the second planetary gear set GS2. In the second planetary gear set GS2, torque is inputted from the input shaft INPUT directly to the second connecting member M2, and is also inputted through the first connecting member M1 to the fourth ring gear R4. The inputted torque is outputted from the third carrier PC3 to the output shaft OUTPUT.

The first clutch C1 (hereinafter also referred to as, input clutch I/C) is a clutch functioning to selectively connect or disconnect the input shaft INPUT with/from the second connecting member M2. The second clutch C2 (hereinafter also referred to as, direct clutch D/C) is a clutch functioning to selectively connect or disconnect the fourth sun gear S4 with/from the fourth carrier PC4. The third clutch C3 (hereinafter also referred to as, H&LR clutch H&LR/C) is a clutch functioning to selectively connect or disconnect the third sun gear S3 with/from the fourth sun gear S4.

The second one-way clutch F2 is disposed between the third sun gear S3 and the fourth sun gear S4. Thereby, the fourth sun gear S4 generates its rotational speed independently from that of the third sun gear S3, when the rotational speed of the fourth sun gear S4 is higher than that of the third sun gear S3 under a state where the third clutch C3 has been released. At this time, the third planetary gear mechanism G3 is connected through the second connecting member M2 with the fourth planetary gear mechanism G4, so that the third planetary gear mechanism G3 attains its gear ratio independent from that of the fourth planetary gear mechanism G4.

The first brake B1 (hereinafter also referred to as, front brake Fr/B) is a brake functioning to selectively stop the rotation of the first carrier PC1 relative to a transmission case CASE (i.e., selectively fix the first carrier PC1 to the transmission case CASE). The first one-way clutch F1 is disposed in parallel with the first brake B1. The second brake B2 (hereinafter also referred to as, low brake LOW/B) is a brake functioning to selectively stop the rotation of the rotation of the third sun gear S3 relative to the transmission case CASE. The third brake B3 (hereinafter also referred to as, 2346 brake 2346/B) is a brake functioning to selectively stop the rotation of third connecting member M3 coupling the first sun gear S1 with the second sun gear S2, relative to the transmission case CASE. The fourth brake B4 (hereinafter also referred to as, reverse brake R/B) is a brake functioning to selectively stop the rotation of the fourth carrier PC4 relative to the transmission case CASE.

Figures 2, 3:
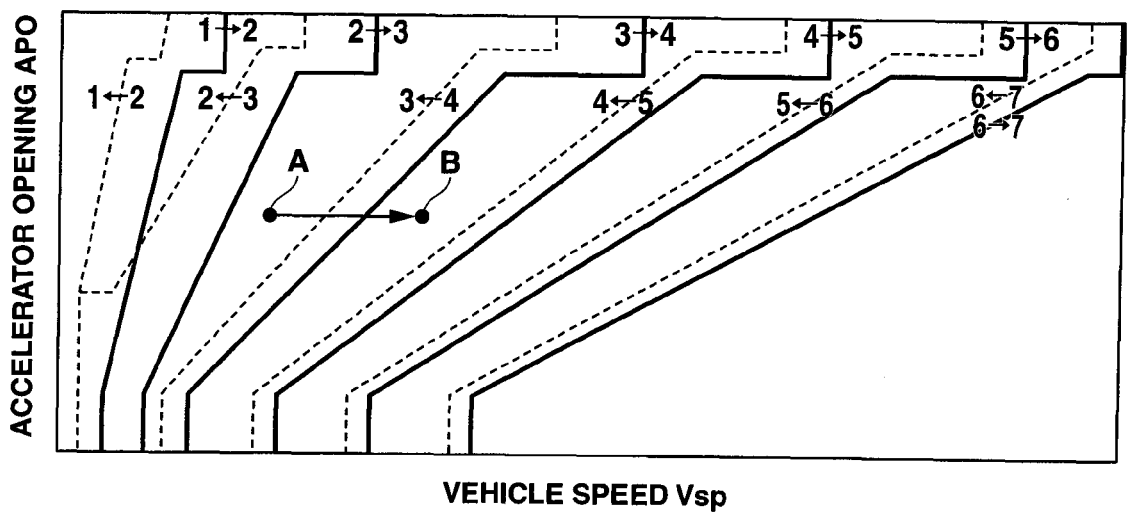
FIG. 2 is an engaging-operation table showing engagement states of respective friction-engagement elements for each transmission ratio of the automatic transmission to which the control apparatus of the first embodiment is applied.
FIG. 3 is a shift diagram showing one example of shift map which is used for a shift control in the first embodiment when a D-range is being selected in the automatic transmission.

FIG. 2 is an engaging-operation table showing engagement states of the respective friction-engagement elements for each transmission-ratio (shift step) in the automatic transmission to which the shift control apparatus according to the first embodiment is applied. In the table of FIG. 2, the sign ○ means that a corresponding friction-engagement element becomes in an engaged state (connected state), and the blank means that a corresponding friction-engagement element becomes in a released state (disconnected state). The sign (○) of FIG. 2 means that a corresponding friction-engagement element becomes in the engaged state in a case that some range position activating an engine brake is being selected.

Each of the transmission-ratios (shift steps) for the forward seven speeds and reverse one speed can be achieved by releasing one friction-engagement element which has been engaged and by engaging the other one friction-engagement element which has been released, among the above-mentioned plurality of friction-engagement elements. That is, each transmission ratio is attained by performing a changeover shift of friction-engagement element in the following manner.

Under the "first speed" (first shift step); only the second brake B2 becomes in the engaged state and thereby the first one-way clutch F1 and second one-way clutch F2 are engaged. Under the "second speed"; the second brake B2 and third brake B3 become in the engaged state, and the second one-way clutch F2 is engaged. Under the "third speed"; the second brake B2, third brake B3 and second clutch C2 become in the engaged state, and neither the first one-way clutch F1 nor second one-way clutch F2 is engaged. Under the "fourth speed"; the third brake B3, second clutch C2 and third clutch C3 become in the engaged state. Under the "fifth speed"; the first clutch C1, second clutch C2 and third clutch C3 become in the engaged state. Under the "sixth speed"; the third brake B3, first clutch C1 and third clutch C3 become in the engaged state. Under the "seventh speed"; the first brake B1, first clutch C1 and third clutch C3 become in the engaged state, and the first one-way clutch F1 is engaged. Under the "reverse speed"; the fourth brake B4, first brake B1 and third clutch C3 become in the engaged state.

FIG. 3 is a shift diagram showing one example of shift map which is used for the shift control in the first embodiment when the D-range is being selected in the automatic transmission. In FIG. 3, solid lines represent upshift lines (i.e., lines for upshift), and dotted lines represent downshift lines (i.e., lines for downshift).

When the D-range is being selected, an existing position of an operating point which is determined based on the vehicle speed Vsp derived from the output-shaft speed sensor 5 (=vehicle speed sensor) and the accelerator opening APO derived from the accelerator opening sensor 1 is searched for on the shift map. In the case that the operating point does not move or moves within a region of one transmission-ratio (shift step) on the shift map of FIG. 3, the transmission ratio is maintained as it is. On the other hand, in the case that the operating point moves and cuts across (crosses over) the upshift line on the shift map of FIG. 3, an upshift command is outputted for changing the transmission ratio from its value represented by the region in which the operating point existed before cutting across the upshift line, to its value represented by a region in which the operating point exists after cutting across the upshift line. Moreover, in the case that the operating point moves and cuts across the downshift line on the shift map of FIG. 3, a downshift command is outputted for changing the transmission ratio from its value represented by the region in which the operating point existed before cutting across the downshift line, to its value represented by a region in which the operating point exists after cutting across the downshift line.

Figure 4:
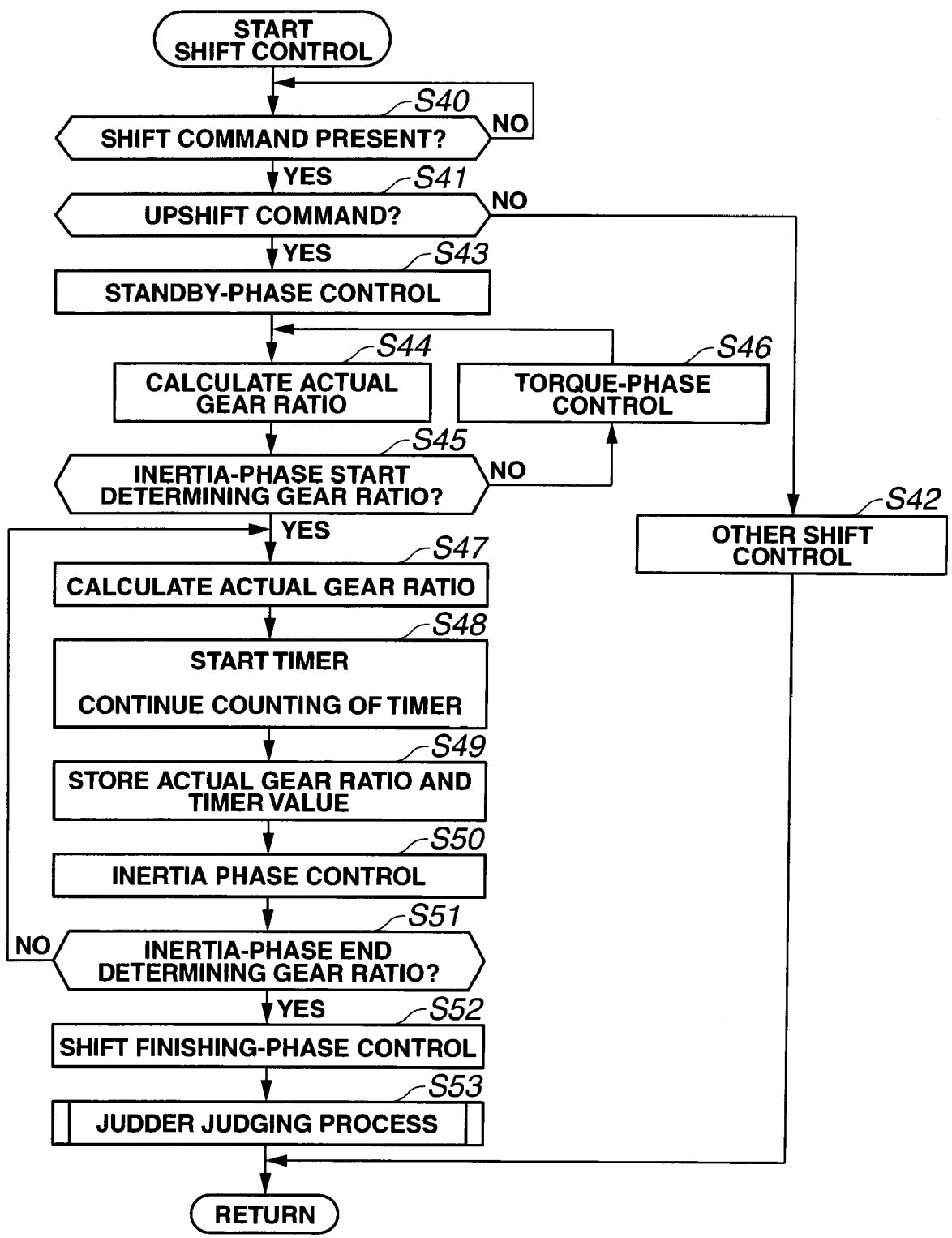
FIG. 4 is a flowchart showing a flow of a shift control process which is executed in an automatic-transmission controller 20 when an upshift command occurs with the D-range being selected, in the first embodiment.

FIG. 4 is a flowchart showing a flow of a shift control process which is executed in the automatic-transmission controller 20 when the upshift command occurs under the state where the D-range is being selected, in the first embodiment. Each step will now be explained. During this shift control process, a shift command (upshift command or downshift command) is constantly checked and read out. It is noted that the automatic-transmission controller 20 serving to execute this process corresponds to a shift control section or means according to the present invention.

At step S40, the controller judges whether or not the output of shift command is present or absent during the selected state of D-range. If YES at step S40, namely if a shift command has occurred; the program proceeds to step S41. If NO at step S40, namely if no shift command has occurred; the judgment of step S40 is repeated.

At step S41 subsequent to step S40, the controller judges whether or not the shift command which has occurred is an upshift command for performing an upshift control with the changeover. If YES at step S41, namely if the shift command is for upshift; the program proceeds to step S43. If NO at step S41, namely if the shift command is other than the upshift command; the program proceeds to step S42. This upshift command means not only a command for an upshift between adjacent two transmission-ratios (shift steps), but also a command for each upshift between two transmission ratios apart from each other by two steps or more (for example, LFUS 3-5 upshift command).

At step S42 subsequent to step S41, the other shift control (for example, a downshift between adjacent two transmission-ratios or a downshift between two transmission ratios apart from each other by two steps or more) is executed, and then the program is returned.

At step S43 subsequent to step S42, the controller carries out a standby-phase control for an engaging-side friction-engagement element, in the upshift control between a pre-shift transmission ratio (pre-shift gear ratio of the transmission) and a post-shift transmission ratio. Then, the program proceeds to step S44. For example, in the case that the shift command is for an upshift from the third speed (pre-shift gear ratio of transmission) to the fourth speed (the other gear ratio of transmission), a shift control is started for engaging the third clutch C3 which is in the released state under the third speed and for releasing the second brake B2 which is in the engaged state under the third speed. In the standby-phase control; a piston chamber of the third clutch C3 regarded as the engaging-side friction-engagement element is made to be filled with oil, and a space between clutch plates of the third clutch C3 is made to be eliminated, in order to allow the third clutch C3 to transmit torque when the clutch plates are engaged by means of a hydraulic pressure supply scheduled to be subsequently conducted. This standby-phase control is executed from an output timing of the upshift command until a timing set by a timer.

At step S44 subsequent to step S43 or step S46, the controller calculates an actual gear ratio (actual transmission ratio) GR of the transmission on the basis of a transmission output rotational speed obtained by the output-shaft speed sensor 5 and a transmission input rotational speed obtained by the first turbine speed sensor 3 and second turbine speed sensor 4. Then, the program proceeds to step S45.

At step S45 subsequent to step S44, the controller judges whether or not the calculated actual gear ratio GR (i.e., current speed ratio of the transmission) has already reached an inertia-phase start determining gear ratio (inertia-phase start determining speed ratio of the transmission) GR_St. If YES at step S45, namely if the actual gear ratio GR has reached the inertia-phase start determining gear ratio GR_St; the program proceeds to step S47. If NO at step S45, namely if the actual gear ratio GR has not yet reached the inertia-phase start determining gear ratio GR_St; the program proceeds to step S46. It is noted that the process of step S45 corresponds to an inertia-phase determining section or means according to the present invention.

At step S46 subsequent to step S45, the controller carries out an engaging pressure control for the engaging-side friction-engagement element and a releasing pressure control for a releasing-side friction-engagement element, for the upshift, under a torque-phase control. Then, the program proceeds back to step S44. This "torque phase" is one of phases which occur with a progress of the shift, and is defined as a period for which the input rotational speed of automatic transmission is not varied and only an output-shaft torque is varied.

At step S47 subsequent to step S45 or step S50, the controller calculates the actual gear ratio GR on the basis of the transmission output rotational speed obtained by the output-shaft speed sensor 5 and the transmission input rotational speed obtained by the first turbine speed sensor 3 and second turbine speed sensor 4 in the same manner as step S44. Then, the program proceeds to step S48.

At step S48 subsequent to step S47, a timer for measuring an elapsed time of inertia phase is started or activated when the program proceeds to step S48 for the first time (from step S45). A counting of the timer is continued until the inertia phase ends. Then, the program proceeds to step S49. If the inertia phase has ended, the timer is reset in order to measure a next elapsed time of the inertia phase.

At step S49 subsequent to step S48, the actual gear ratio GR calculated at step S47 and a value of the timer measured at step S48 are stored or memorized as a pair of values every time an inertia-phase control process is repeated. Then, the program proceeds to step S50.

At step S50 subsequent to step S49, a predetermined engaging pressure control and a predetermined releasing pressure control during the inertia phase period are carried out respectively for the engaging-side friction-engagement element and the releasing-side friction-engagement element for the upshift. Then, the program proceeds to step S51.

At step S51 subsequent to step S50, the controller judges whether or not the actual gear ratio GR has reached an inertia-phase end determining gear ratio (inertia-phase end determining speed ratio of the transmission) GR_End. If YES at step S51, the program proceeds to step S52. If NO at step S51, the program proceeds back to step S47. It is noted that the process of step S51 corresponds to the inertia-phase determining section or means according to the present invention.

At step S52 subsequent to step S51, the controller executes a shift finishing-phase control. That is, the shift finishing-phase control is executed so that the engaging pressure of the engaging-side friction-engagement element for the upshift is increased to a line pressure, and the releasing pressure of the releasing-side friction-engagement element is reduced to a drain pressure. Then, the program proceeds to step S53.

Figure 5:
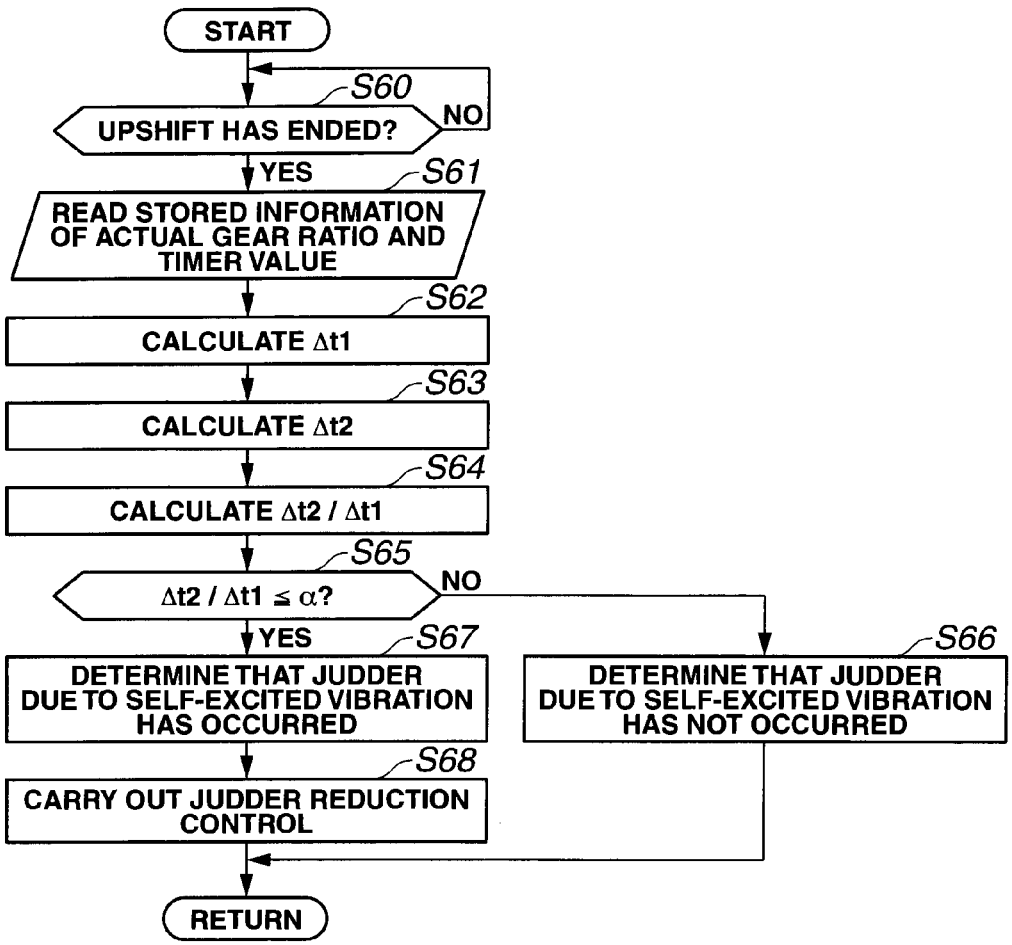
FIG. 5 is a flowchart showing a flow of a judder judging process which is executed by the automatic-transmission controller 20 in the first embodiment.

At step S53 subsequent to step S52, a judder judging process is executed based on the stored information of the pair of actual gear ratio GR and timer value obtained at step S49, as shown by a flowchart of FIG. 5. Then, the program is returned.

Figure 6:
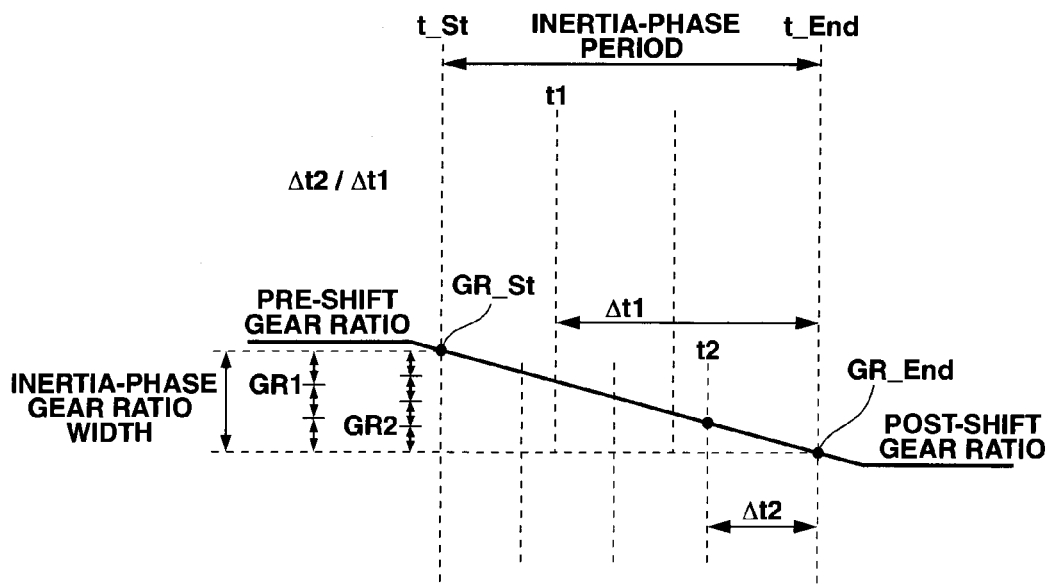
FIG. 6 is a characteristic view of gear-ratio variation showing a way to determine a first inertia-phase period $\Delta t1$ and a second inertia-phase period $\Delta t2$ which are used in the judder judging process that is executed by the automatic-transmission controller 20 in the first embodiment.
Figure 7:
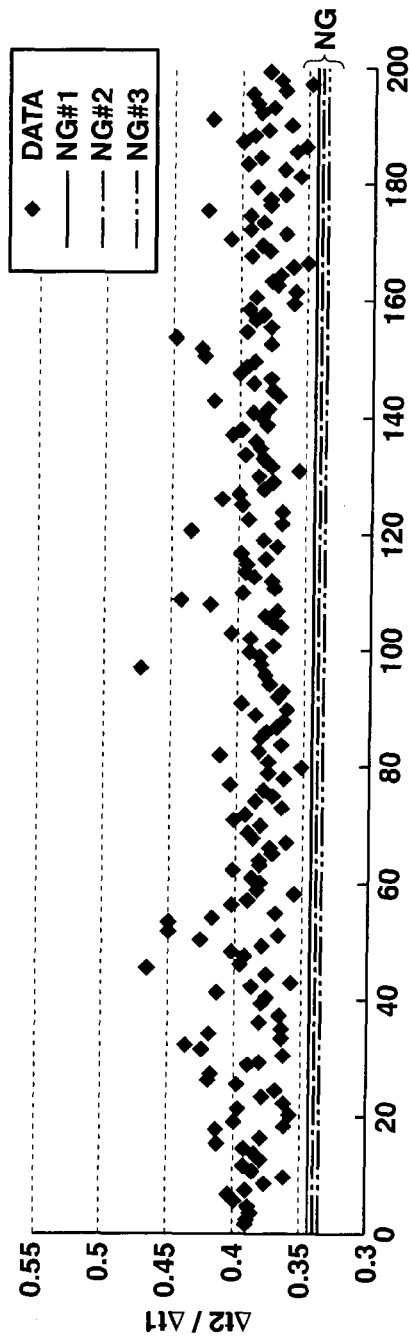
FIG. 7 is a view showing a dispersion characteristic of two hundred inertia-phase period ratios $\Delta t2/\Delta t1$ measured for determining a judder judgment threshold value $\alpha$ which is used in the judder judging process that is executed by the automatic-transmission controller 20 in the first embodiment.
Figure 8:
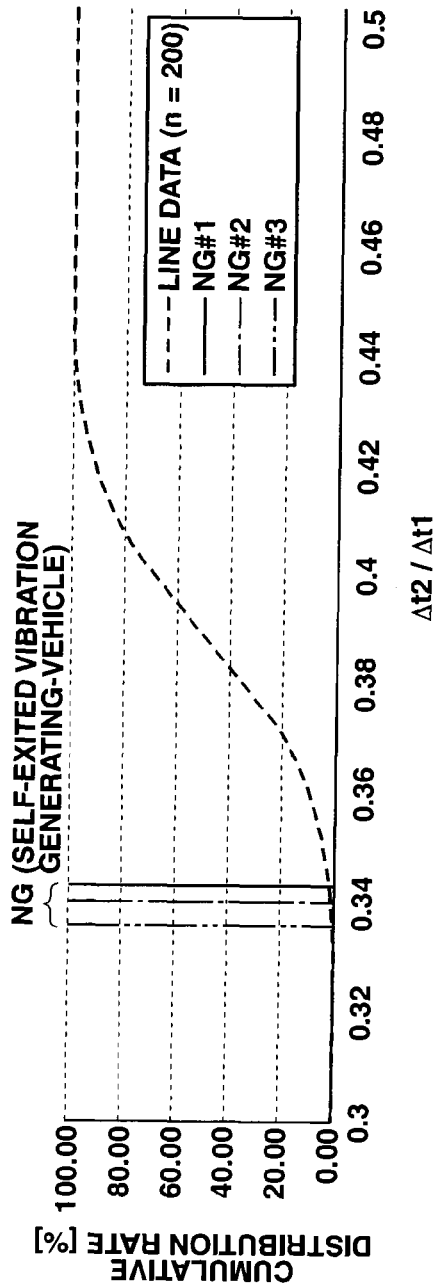
FIG. 8 is a view showing a cumulative distribution-rate characteristic of the two hundred inertia-phase period ratios $\Delta t2/\Delta t1$ measured for determining the judder judgment threshold value $\alpha$.

FIG. 5 is the flowchart showing a flow of the judder judging process which is executed by the automatic-transmission controller 20 in the first embodiment. It is noted that this process corresponds to a judder judging section or means according to the present invention. FIG. 6 is a characteristic view of gear-ratio variation which shows a way to determine a first inertia-phase period $\Delta t1$ and a second inertia-phase period $\Delta t2$ that are used in the judder judging process executed by the automatic-transmission controller 20 in the first embodiment. FIG. 7 is a view showing a dispersion characteristic of two hundred inertia-phase period ratios $\Delta t2/\Delta t1$ measured in order to determine a judder judgment threshold value $\alpha$ which is used in the judder judging process executed by the automatic-transmission controller 20 in the first embodiment. FIG. 8 is a view showing a cumulative distribution-rate characteristic of the two hundred inertia-phase period ratios $\Delta t2/\Delta t1$ measured in order to determine the judder judgment threshold value $\alpha$. Each step of the flowchart of FIG. 5 will now be explained.

At step S60, the controller judges whether or not the upshift has ended. If YES at step S60, namely if the upshift has ended; the program proceeds to step S61. If NO at step S60, namely if the upshift has not yet ended; the judgment of step S60 is repeated.

At step S61 subsequent to step S60, the controller reads the pair of stored information of the actual gear ratios GR and the timer values during the inertia phase period which are obtained at step S49 of FIG. 4. Then, the program proceeds to step S62.

At step S62 subsequent to step S61, the controller calculates the first inertia-phase period $\Delta t1$ based on the pair of stored information read out at step S61. Then, the program proceeds to step S63. It is noted that the process of step S62 corresponds to a characteristic-gradient index-value calculating section or means according to the present invention. A calculation procedure of the first inertia-phase period $\Delta t1$ is now explained. At first, as shown in FIG. 6, a time point when the actual gear ratio GR reaches the inertia-phase start determining gear ratio GR_St is defined as an inertia-phase start time t_St, and a time point when the actual gear ratio GR reaches the inertia-phase end determining gear ratio GR_End is defined as an inertia-phase end time t_END. A pre-shift-side one of two intermediate values obtained by equally trisecting an inertia-phase gear ratio width (given between GR_St and GR_End) is defined as a first gear ratio (first transmission ratio) GR1. That is, the first gear ratio GR1 is a gear ratio value advanced from the inertia-phase start determining gear ratio GR_St by a ⅓ amount of the inertia-phase gear ratio width, toward the inertia-phase end determining gear ratio GR_End. A time point when the actual gear ratio GR becomes equal to the first gear ratio GR1 with a progress of the shift is defined as a first time point t1. The first inertia-phase period $\Delta t1$ is calculated as a time period (hereinafter also referred to as, a first time period) between the first time point t1 and the inertia-phase end time t_END. It is noted that the first inertia-phase period $\Delta t1$ corresponds to a first drive-system physical quantity according to the present invention.

At step S63 subsequent to step S61, the controller calculates the second inertia-phase period $\Delta t2$ based on the pair of stored information read out at step S61. Then, the program proceeds to step S64. It is noted that the process of step S63 corresponds to the characteristic-gradient index-value calculating section or means according to the present invention. A calculation procedure of the second inertia-phase period $\Delta t2$ is now explained. As shown in FIG. 6, a most post-shift-side one of three intermediate values obtained by equally quartering the inertia-phase gear ratio width (given between GR_St and GR_End) is defined as a second gear ratio (second transmission ratio) GR2. That is, the second gear ratio GR2 is a gear ratio value advanced from the inertia-phase start determining gear ratio GR_St by a ¾ amount of the inertia-phase gear ratio width, toward the inertia-phase end determining gear ratio GR_End. Hence, the second gear ratio GR2 means a more advanced degree in shift progress than the first gear ratio GR1. A time point when the actual gear ratio GR becomes equal to the second gear ratio GR2 with the progress of shift is defined as a second time point t2. The second inertia-phase period $\Delta t2$ is calculated as a time period (hereinafter also referred to as, a second time period) between the second time point t2 and the inertia-phase end time t_END. It is noted that the second inertia-phase period $\Delta t2$ corresponds to a second drive-system physical quantity according to the present invention, and the second time period corresponds to an inertia-phase ending period according to the present invention.

At step S64 subsequent to step S63, the controller calculates the inertia-phase period ratio $\Delta t2/\Delta t1$ from the first inertia-phase period $\Delta t1$ and second inertia-phase period $\Delta t2$. Then, the program proceeds to step S65. It is noted that the inertia-phase period ratio $\Delta t2/\Delta t1$ corresponds to a drive-system physical quantity ratio or a characteristic-gradient index value according to the present invention, and the process of step S64 corresponds to the characteristic-gradient index-value calculating section or means according to the present invention.

At step S65 subsequent to step S64, the controller judges whether or not the inertia-phase period ratio $\Delta t2/\Delta t1$ is smaller than or equal to the judder judgment threshold value $\alpha$ (for example, $\alpha=0.34$). If YES at step S65, namely if $\Delta t2/\Delta t1 \leq \alpha$; the program proceeds to step S67. If NO at step S65, namely if $\Delta t2/\Delta t1 > \alpha$; the program proceeds to step S66. It is noted that the process of step S65 corresponds to the judder judging section or means according to the present invention.

The judder judgment threshold value $\alpha$ is determined based on a large number of (sample) measurement data. In the case of the first embodiment, the inertia-phase period ratio $\Delta t2/\Delta t1$ was measured in each of two hundred automatic transmissions, and thereby an occurrence of the judder was found or recognized in three automatic transmissions among these 200 automatic transmissions. FIG. 7 is a view showing a dispersion characteristic of the measurement data of inertia-phase period ratios Δt2/Δt1. FIG. 8 is a view showing a cumulative distribution-rate characteristic of the measurement data of inertia-phase period ratios Δt2/Δt1. As evidenced by FIGS. 7 and 8, in the three automatic transmissions in each of which the judder was caused; the inertia-phase period ratios Δt2/Δt1 take values lower than those of the other automatic transmissions in each of which the judder was not caused. Moreover, all of the inertia-phase period ratios Δt2/Δt1 of these three automatic transmissions are near 0.34. Therefore, in the case of the first embodiment, the judder judgment threshold value α can be set at 0.34, namely can be determined as α=0.34.

At step S66 subsequent to step S65, the controller determines that a judder due to self-excited vibration has not occurred. The program is returned.

At step S67 subsequent to step S65, the controller determines that a judder due to self-excited vibration has occurred. The program proceeds to step S68.

At step S68 subsequent to step S67, the controller carries out a judder reduction control for shortening a shifting time (a time period necessary for gear shift of the transmission) at the time of a shift mode for upshift which is conducted in the future after the current determination of judder occurrence and which is same as a shift mode of the current shift. That is, in the case where the controller determines that the judder of self-excited vibration has occurred, the judder reduction control is carried out so as to shorten the shifting time of automatic transmission when a shift having its shift mode same as that of the current shift receiving the judder-occurrence determination is carried out next after the current determination. Then, the program is returned. It is noted that the process of step S68 corresponds to a judder reduction-control executing section or means according to the present invention. The judder reduction control is performed, for example, by increasing a hydraulic pressure for shift by a predetermined amount on the basis of a learning-control information of a judder determination flag, so that the shifting time is shortened to reduce the judder. Alternatively, the judder reduction control is performed, for example, by conducting a cooperative control for lowering the engine torque by a predetermined amount during the shift or the inertia phase, so that the shifting time is shortened to reduce the judder. For example, in the case that the occurrence of judder is not sufficiently suppressed by one-time execution of the judder reduction control, the judder reduction control is executed multiple times until the occurrence of judder is sufficiently suppressed.

Next, operations and advantages in the first embodiment will be explained. The operations and advantages in the control apparatus for the automatic transmission in the first embodiment will now be explained by a run of the items of "Regarding Countermeasure against Judder in Automatic Transmission", "Judder Judging Mechanism according to the Present Invention", "Operation of Shift Control" and "Operation of Judder Judgment".

[Regarding Countermeasure Against Judder in Automatic Transmission]

"Judder" is a self-excited vibration in which an amplitude of vibration of friction element gradually increases with the lapse of time and thereby oscillates greatly, when the friction element is used in a slip state. In a case of automatic transmission; an engaging-side friction-engagement element changes from the released state through a slipping-engaged state to a complete-engaged state in a short time, at the time of changeover shift. If the judder occurs at this time, there is a possibility that a shift shock is worsened, a noise due to high-frequency judder is caused, and/or a friction material is damaged. Thus, the judder affects a riding comfort and a quietness and also deteriorates a durability of friction-engagement element. Therefore, it is necessary to judge and controllably prevent the occurrence of the judder.

Nowadays, it is known that a self-excited vibration which is caused in the case where a characteristic of friction element has a negative gradient is one cause (source) of the occurrence of judder at the time of shift of automatic transmission. However, nowadays, in order to judge whether the μ-v characteristic of friction element has a positive gradient or negative gradient, it is necessary to measure friction coefficients of the friction element by varying a relative rotational speed multiple times and to connect the measured multiple plots with one another by use of approximate line. That is, the judgment of the μ-v characteristic of friction element needs to be performed by such a direct measurement method.

In the case of above-introduced Japanese Patent Publication Application No. 10-159872; a oscillation frequency is analyzed when the vibration (oscillation) occurs, and it is judged whether the judder is present or absent by detecting an presence or absence of a judder frequency-component (18 Hz~20 Hz). However, this is not a judgment focused on whether a positive gradient or negative gradient in the μ-v characteristic of friction element. That is, in this technique, the vibration caused as a result is merely analyzed so as to judge whether the occurrence of the judder is present or absent, without checking a cause of the occurrence of vibration.

Accordingly, if it can be detected that the μ-v characteristic of friction element has a negative gradient in the automatic transmission, it can be determined that a possibility of the occurrence of judder due to self-excited vibration (18 Hz~20 Hz) is high. However, nowadays, there has not been a proposal of a negative-gradient judging method for the μ-v characteristic which can be used for a judder prevention control for the automatic transmission. Hence, a proposal of the judging method is being desired which is capable of accurately and simply judging whether or not the μ-v characteristic of friction element forms a negative gradient.

[Judder Judging Mechanism According to the Present Invention]

Figure 11:
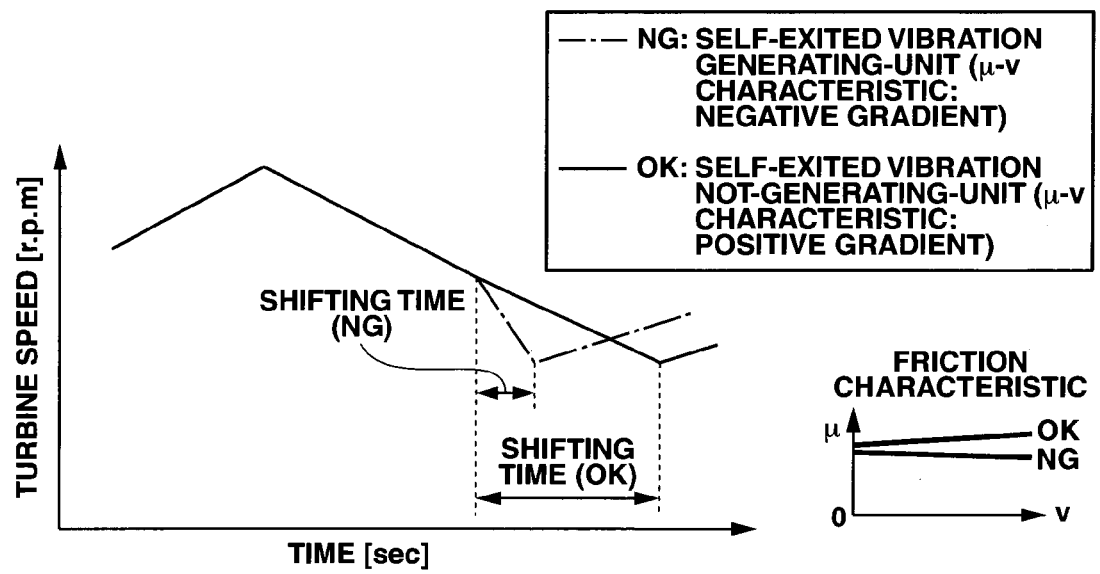
FIG. 11 is a view showing a comparative characteristic of turbine speed in an inertia-phase region, between a case that a friction-engagement element having a $\mu$-v characteristic of positive gradient is engaged at the time of upshift and a case that a friction-engagement element having a $\mu$-v characteristic of negative gradient is engaged at the time of upshift.

FIG. 9 is a view showing μ-v characteristics of friction elements having positive and negative gradients. FIG. 10A is an explanatory view showing a vibration of friction element, and showing its simplified vibration model. FIG. 10B is an explanatory view showing the vibration of friction element, and showing its equation of motion. FIG. 11 is a view showing a comparative characteristic of turbine speed in the inertia-phase region, between a case that a friction-engagement element having a μ-v characteristic of positive gradient is engaged at the time of upshift and a case that a friction-engagement element having a μ-v characteristic of negative gradient is engaged at the time of upshift.

A judder judging technique according to the present invention meets the desire of proposal of a judging method which is capable of accurately and simply judging whether or not the μ-v characteristic of friction element has a negative gradient, as mentioned above. Details about the judder judging mechanism according to the present invention will now be explained.

At first, the positive gradient characteristic and the negative gradient characteristic exist as the μ-v characteristic of friction element, as shown in FIG. 9. In the case of positive gradient characteristic, the friction coefficient μ becomes smaller as the relative rotational speed v becomes lower. Inversely, in the case of negative gradient characteristic, the friction coefficient μ becomes greater as the relative rotational speed v becomes lower.

Next, the motion equation of the vibration model (simplified model) shown in FIG. 10A is represented by a following formula (1), as shown in FIG. 10B.

$$m(d^2x/dt^2)+mg\cdot(\Delta\mu/\Delta v)+kx=0 \quad (1)$$

where, m denotes a mass, k denotes a spring constant, x denotes a displacement, and g denotes a gravitational acceleration.

Generally, a friction coefficient ($\Delta\mu/\Delta v$) functions to apply a force so as to absorb and attenuate a motion of the mass m. Accordingly, when the friction coefficient ($\Delta\mu/\Delta v$) take a negative value; the motion is not absorbed (i.e., a vibration due to a spring is not absorbed) so that the vibration diverges to generate a self-excited vibration. That is, as is clear from the motion equation of vibration model, in the case that the $\mu$-v characteristic of friction element forms a negative gradient, the judder due to self-excited vibration is generated.

In an action of shift control during the inertia phase in which the gear ratio is varied (i.e., the inertia phase is defined as a time period for which the input speed (or the speed ratio) of automatic transmission continues to vary practically for the shift), the relative rotational speed v of the engaging-side friction-engagement element varies toward 0 with a progress of the inertia phase. Accordingly, in the case that the $\mu$-v characteristic of the engaging-side friction-engagement element forms a positive gradient, the friction coefficient $\mu$ becomes smaller with the progress of the inertia phase. On the other hand, in the case that the $\mu$-v characteristic of the engaging-side friction-engagement element forms a negative gradient, the friction coefficient $\mu$ becomes greater with the progress of the inertia phase. Thus, when the friction coefficient $\mu$ has become great, a torque capacity of the engaging-side friction-engagement element is rapidly increased so that the engaging-side friction-engagement element is engaged with a high responsivity as compared with the case that the friction coefficient $\mu$ becomes small. Accordingly, as shown by an alternate long and short dash line in FIG. 11, it is discovered that a shifting time (NG pattern) during the ending period (i.e., last part) of the inertia phase in the case of negative-gradient characteristic is short as compared with a shifting time (OK pattern) during the ending period of the inertia phase in the case of positive-gradient characteristic. Moreover, it is discovered that the shifting time (NG pattern) becomes shorter as the $\mu$-v characteristic of the engaging-side friction-engagement element has a steeper negative gradient.

This shifting time during the ending period of inertia phase is one of phenomena that appear in a different way in dependence upon whether the $\mu$-v characteristic of the engaging-side friction-engagement element is the positive-gradient characteristic or negative-gradient characteristic. By calculating the inertia-phase period ratio $\Delta t2/\Delta t1$ quantifying this phenomenon as the characteristic-gradient index value, it becomes possible to judge the presence or absence of the judder that is caused due to the negative gradient of the $\mu$-v characteristic.

[Operation of Shift Control]

As one example, the operation of shift control will now be explained based on the flowchart of FIG. 4, in the case that an upshift command from third speed to fourth speed is outputted since the operating point moves from an operating point A across the upshift line to an operating point B with the accelerator opening kept constant, on the shift diagram of FIG. 3.

At first, when the upshift command between the third speed and the fourth speed is outputted, the program proceeds as step S40→step S41→step S43 on the flowchart of FIG. 4. At step S43, the standby-phase control is executed and applied to the third clutch C3 since the third clutch C3 serves as the engaging-side friction-engagement element at the time of upshift from third speed to fourth speed. Then, when the standby-phase control of step S43 ends; the program proceeds from step S43 to step S44, and a flow of step S44→step S45→step S46 on the flowchart of FIG. 4 is repeated. At step S46, the engaging pressure control and the releasing pressure control under the torque-phase control are applied to the third clutch C3 which serves as the engaging-side friction-engagement element and the second brake B2 which serves as the releasing-side friction-engagement element at the time of upshift of third speed→fourth speed.

Then, when it is determined that the actual gear ratio GR has reached the inertia-phase start determining gear ratio GR_St at step S45; the program proceeds from step S45 to step S47, and a flow of step S47→step S48→step S49→step S50→step S51 on the flowchart of FIG. 4 is repeated. At step S50, the engaging pressure control and the releasing pressure control under the inertia-phase control are applied to the third clutch C3 and the second brake B2.

Then, when it is determined that the actual gear ratio GR has reached the inertia-phase end determining gear ratio GR_End at step S51; the program proceeds from step S51 to step S52 on the flowchart of FIG. 4. At step S52, the engaging pressure control and the releasing pressure control under the shift finishing-phase control are applied to the third clutch C3 and the second brake B2.

When the shift finishing-phase control is completed, the program proceeds to step S53. At step S53, the judder judging process is executed based on the stored information of the pair of actual gear ratio GR and timer value obtained at step S49, as shown by the flowchart of FIG. 5.

That is, for example, in the case that the upshift is performed from third speed to fourth speed, the information of pair of actual gear ratio GR and timer value is continuously stored during the inertia-phase control of shift control. Thereby, the judder judging process of the third clutch C3 can be attained based on these stored information. In other words, the information necessary for the judging process for the judder of engaging-side friction-engagement element (third clutch C3) during an experience of $3^{rd}$→$4^{th}$ upshift can be obtained under the inertia-phase control of this $3^{rd}$→$4^{th}$ upshift, by utilizing the gear-ratio information used for the upshift control.

[Operation of Judder Judgment]

The operation of the judder judgment for third clutch C3 which is performed by experiencing the upshift from $3^{rd}$ speed to $4^{th}$ speed will now be explained based on the flowchart of FIG. 5.

At first, when the upshift from $3^{rd}$ speed to $4^{th}$ speed is ended, the program proceeds as step S60→step S61→step S62→step S63→step S64→step S65 on the flowchart of FIG. 5. At step S61, the controller reads the stored information of the pair of actual gear ratios GR and timer values which is obtained during the inertia-phase period at step S49 shown in FIG. 4. At step S62, the first inertia-phase period $\Delta t1$ is calculated based on the read information (stored values regarding each of the actual gear ratio GR and the timer value). At step S63, the second inertia-phase period $\Delta t2$ is calculated based on the read information. At step S64, the inertia-phase period ratio $\Delta t2/\Delta t1$ is calculated. At step S65, it is judged whether or not the inertia-phase period ratio $\Delta t2/\Delta t1$ is smaller than or equal to the judder judgment threshold value $\alpha$.

If NO at step S65, namely if a relation: $\Delta t2/\Delta t1>\alpha$ is satisfied; the program proceeds to step S66. At step S66, as a result, it is determined that the judder due to self-excited vibration has not occurred. On the other hand, If YES at step S65, namely if a relation: $\Delta t2/\Delta t1 \leq \alpha$ is satisfied; the program proceeds to step S67. At step S67, as a result, it is determined that the judder due to self-excited vibration has occurred.

Thus, by calculating the inertia-phase period ratio $\Delta t2/\Delta t1$ as an index value obtainable by quantifying the phenomenon that appears differently in dependence upon whether the positive-gradient characteristic or negative-gradient characteristic in $\mu$-v characteristic, it can be judged whether the judder which is caused by the negative-gradient $\mu$-v characteristic has actually occurred. Moreover, since the judder judgment is carried out by utilizing the inertia phase of shift control, the parameter (actual gear ratio GR) which is used by the operation of normal shift control shown by FIG. 4 can be used for this judder judgment so that an additional new structure is unnecessary.

In the judder judging process of the first embodiment, the ending period of inertia phase during which the relative rotational speed of the third clutch C3 approaches 0 is specified (defined) by the second time period (i.e., time period between the second time point t2 and the inertia-phase end time t_END, wherein the second time point t2 is a time point when the actual gear ratio GR becomes equal to the second gear ratio GR2 which is a gear ratio value advanced from the inertia-phase start determining gear ratio GR_St toward the inertia-phase end determining gear ratio GR_End by ¾ amount, as explained above) within the inertia-phase period defined between the start and end of the inertia phase. Thereby, the second inertia-phase period $\Delta t2$ meaning the specified ending period of inertia phase is calculated as the measurable drive-system physical quantity. Accordingly, the difference of shifting time which prominently appears during the ending period of inertia phase and which is attributed to whether the $\mu$-v characteristic of third clutch C3 has a positive gradient or a negative gradient can be recognized by this drive-system physical quantity. Thereby, the occurrence of the judder which is caused in the case where the $\mu$-v characteristic of third clutch C3 has a negative gradient can be accurately judged.

In the judder judging process of the first embodiment, the second inertia-phase period $\Delta t2$ itself is not directly used as the characteristic-gradient index value. That is, the inertia-phase period ratio $\Delta t2/\Delta t1$ which is a time period ratio of the second inertia-phase period $\Delta t2$ to the first inertia-phase period $\Delta t1$ meaning a reference shifting time is calculated and used as the characteristic-gradient index value. Accordingly, an influence of dispersion (variation) of hydraulic pressure and/or an influence of dispersion of engine torque which act as disturbances are eliminated so that the judder can be accurately judged even if there are the dispersion of hydraulic pressure and/or the dispersion of engine torque. Incidentally, if trying to judge the judder by use of only the second inertia-phase period $\Delta t2$; there is a possibility that it is erroneously determined that the judder has occurred in the case where the $\mu$-v characteristic is the positive gradient characteristic. This erroneous determination is caused, for example, when the shifting time becomes relatively short so that the second inertia-phase period $\Delta t2$ becomes short due to the dispersion of hydraulic pressure and/or engine torque.

In the judder judging process of the first embodiment, the first inertia-phase period $\Delta t1$ meaning a reference for the shifting time is specified (defined) by the first time period (i.e., time period between the first time point t1 and the inertia-phase end time t_END, wherein the first time point t1 is a time point when the actual gear ratio GR becomes equal to the first gear ratio GR1 which is a gear ratio value advanced from the inertia-phase start determining gear ratio GR_St toward the inertia-phase end determining gear ratio GR_End by ⅓ amount, as explained above). Accordingly, an initial stage (starting period) of inertia phase during which a changing progress of the transmission ratio is unstable is removed from the first inertia-phase period $\Delta t1$. Hence, the occurrence of judder can be accurately judged by using the inertia-phase period ratio $\Delta t2/\Delta t1$.

In the judder judging process of the first embodiment, it is determined that the judder of self-excited vibration has occurred when the calculated inertia-phase period ratio $\Delta t2/\Delta t1$ is smaller than or equal to the judder judgment threshold value $\alpha$. Thus, by giving the judder judgment threshold value $\alpha$ through previously-obtained experimental data and by comparing the inertia-phase period ratio $\Delta t2/\Delta t1$ with the given judder judgment threshold value $\alpha$, the occurrence of the judder which is caused in the case where the $\mu$-v characteristic has a negative gradient can be judged accurately and simply.

In the first embodiment, when it is determined that the judder has occurred at step S67 in the flowchart of FIG. 5, the program proceeds from step S67 to step S68. Then, at step S68, the judder reduction control for shortening the shifting time is executed when a shift mode for upshift which is same as a shift mode in the case of the current determination of judder occurrence is carried out later after the current determination. Accordingly, if the judder is detected, the occurrence of judder can be promptly suppressed as a countermeasure. Therefore, even if the judder is caused only once at the time of upshift, the judder can be suppressed at the next-time upshift.

Next, structures and effects in the first embodiment according to the present invention will now be explained. According to the control apparatus for an automatic transmission in the first embodiment, the following listed advantageous effects can be attained.

(1) The control apparatus for an automatic transmission in the first embodiment includes the shift control section (20, FIG. 4) configured to perform the shift of automatic transmission by engaging a first friction-engagement element (third clutch C3) which is in released state, and by releasing a second friction-engagement element (second brake B2) which is in engaged state; and the judder judging section (20, S53, FIG. 5) configured to judge the occurrence of judder due to self-excited vibration. The shift control section (20, FIG. 4) includes the inertia-phase determining section (20, S45, S51) configured to judge whether or not the progress of shift is during the inertia phase which is one of phases each representing a degree of the shift progress under the shift control and for which the input speed of automatic transmission is varied. The judder judging section (20, S53, FIG. 5) is configured to calculate the characteristic-gradient index value ($\Delta t2/\Delta t1$). This characteristic-gradient index value ($\Delta t2/\Delta t1$) is a value obtained by quantifying a phenomenon that appears as the relative rotational speed v of input and output of the first friction-engagement element (third clutch C3) becomes reduced with a progress of the inertia phase. This phenomenon appears in a different way in dependence upon whether the relational characteristic ($\mu$-v characteristic) of the friction coefficient A of the first friction-engagement element (third clutch C3) with respect to the relative rotational speed v is a positive-gradient characteristic or a negative-gradient characteristic. Thereby, the judder judging section (20, S53, FIG. 5) is configured to determine that the judder has occurred, when the characteristic-gradient index value ($\Delta t2/\Delta t1$) indicates that the phenomenon has appeared due to the negative-gradient characteristic. Accordingly, the presence or absence of the judder which is due to the negative gradient of $\mu$-v characteristic of friction-engagement element that is to be engaged at the time of execution of shift can be accurately judged without complicating the structure of apparatus and also without increasing the calculation load.

(2) The judder judging section (20, S53, FIG. 5) includes the characteristic-gradient index-value calculating section (20, S62-S64) configured to specify the ending period (between t2 and t_End) of the inertia phase as a period for which the relative rotational speed of the first friction-engagement element (third clutch C3) approaches 0, within the inertia phase period defined between start and end of the inertia phase; and configured to calculate the drive-system physical quantity ($\Delta t2$) which appears during the specified ending period of the inertia phase, as the characteristic-gradient index value. Accordingly, the difference of phenomenon that depends on whether the μ-v characteristic of first friction-engagement element is the positive-gradient characteristic or the negative-gradient characteristic and that becomes pronounced in the ending period of inertia phase can be recognized. Therefore, the judder due to the negative-gradient μ-v characteristic can be accurately judged.

(3) The characteristic-gradient index-value calculating section (20, S62-S64) is configured to calculate the first drive-system physical quantity ($\Delta t1$) which appears during the period between an starting region and an ending region of the inertia phase; and to calculate the second drive-system physical quantity ($\Delta t2$) which appears during the specified ending period of inertia phase. Thereby, the characteristic-gradient index-value calculating section (20, S62-S64) calculates the ratio ($\Delta t2/\Delta t1$) between the first drive-system physical quantity ($\Delta t1$) and the second drive-system physical quantity ($\Delta t2$), as the characteristic-gradient index value. Accordingly, an influence of the dispersion of hydraulic pressure and the dispersion of engine torque which act as disturbances is removed. Therefore, the judder due to the negative-gradient μ-v characteristic can be accurately judged even if there are the dispersion of hydraulic pressure and the dispersion of engine torque.

(4) The characteristic-gradient index-value calculating section (20, S62-S64) is configured to define a time point when the actual transmission ratio (GR) of the automatic transmission becomes equal to the inertia-phase start determining transmission ratio (GR_St), as the inertia-phase start time (t_St); and configured to define a time point when the actual transmission ratio (GR) becomes equal to the inertia-phase end determining transmission ratio (GR_End), as the inertia-phase end time (t_END). Thereby, the characteristic-gradient index-value calculating section (20, S62-S64) calculates the first drive-system physical quantity ($\Delta t1$) corresponding to the first time period between the first time point (t1) and the inertia-phase end time (t_END). This first time point (t1) is a time point when the actual transmission ratio (GR) becomes equal to the first transmission ratio (GR1) by the progress of the shift from the inertia-phase start time (t_St). Moreover, the characteristic-gradient index-value calculating section (20, S62-S64) calculates the second drive-system physical quantity ($\Delta t2$) corresponding to the second time period between the second time point (t2) and the inertia-phase end time (t_END). This second time point (t2) is a time point when the actual transmission ratio (GR) becomes equal to the second transmission ratio (GR2) which is a transmission ratio value advanced from the first transmission ratio (GR1) by the progress of the shift. Accordingly, the initial stage of inertia phase during which the progress of change of the transmission ratio is unstable is removed from the first drive-system physical quantity ($\Delta t1$) serving as a reference value. Hence, by using the ratio between the first drive-system physical quantity ($\Delta t1$) and the second drive-system physical quantity ($\Delta t2$), it can be accurately judged whether or not the judder has occurred due to the μ-v characteristic forming the negative-gradient characteristic.

(5) The characteristic-gradient index-value calculating section (20, S62, S63, S64) is configured to specify each of the first drive-system physical quantity and the second drive-system physical quantity by using an elapsed time period within the inertia phase, and configured to calculate a ratio ($\Delta t2/\Delta t1$) of the second inertia-phase period ($\Delta t2$) corresponding to the second drive-system physical quantity relative to the first inertia-phase period ($\Delta t1$) corresponding to the first drive-system physical quantity, as the characteristic-gradient index value. The judder judging section (20, S53, FIG. 5, S65) is configured to determine that the judder of self-excited vibration has occurred when the ratio ($\Delta t2/\Delta t1$) of the second inertia-phase period ($\Delta t2$) to the first inertia-phase period ($\Delta t1$) is lower than or equal to the judder judgment threshold value ($\alpha$). Accordingly, since the ratio $\Delta t2/\Delta t1$ is compared with the judder judgment threshold value $\alpha$ which is predetermined based on the previously-obtained experimental data, the occurrence of judder due to the μ-v characteristic forming the negative-gradient characteristic can be judged simply and accurately.

(6) The judder judging section (20, S53, FIG. 5) includes the judder reduction-control executing section (S68) configured, in a case where it is determined that the judder has occurred due to self-excited vibration, to carry out the judder reduction control to shorten the shifting time of the automatic transmission when a shift having a shift mode same as that of the shift receiving the current determination of judder occurrence is conducted next after the current determination. Accordingly, if the judder due to the negative-gradient μ-v characteristic has been detected, the occurrence of judder can be promptly reduced as a countermeasure.

In summary, as shown by the motion equation of vibration model, the self-excited vibration (judder) is caused in the case where the μ-v characteristic of friction element can be represented by a negative gradient line (i.e., an inverse characteristic in which the friction coefficient μ becomes greater as the relative rotational speed v becomes lower). When focusing on the shift control, the relative rotational speed v of engaging-side friction-engagement element during the inertia-phase period varies toward 0 with a progress of the inertia phase. Hence, the friction coefficient μ becomes smaller with the progress of inertia phase in the case that the μ-v characteristic of the engaging-side friction-engagement element forms a positive gradient. On the other hand, the friction coefficient μ becomes greater with the progress of inertia phase in the case that the μ-v characteristic of engaging-side friction-engagement element forms a negative gradient. Accordingly, the shifting time in the case of negative gradient characteristic is shorter than that in the case of positive gradient characteristic. (The difference of) This shifting time is a phenomenon that appears differently in dependence upon whether the μ-v characteristic of engaging-side friction-engagement element is the positive gradient characteristic or the negative gradient characteristic. By calculating the characteristic-gradient index value obtained by quantifying this phenomenon, the presence or absence of the judder due to the negative-gradient μ-v characteristic can be judged. Moreover, by employing a judder judgment using the inertia phase of shift control; new structures do not need to be added, and parameters (such as transmission-ratio information) which are used in normal (usual) shift control can be utilized. As a result, without incurring a complication of structure and an increase of calculation load, it can be accurately judged whether the judder which is caused in the case where a friction-engagement element scheduled to be engaged for the shift has the negative-gradient μ-v characteristic has actually occurred or not occurred at the time of shift.

Although the invention has been described above with reference to certain embodiment according to the invention, the invention is not limited to the embodiment described above. Modifications and variations of the embodiment described above will occur to those skilled in the art in light of the above teachings.

Figure 12:
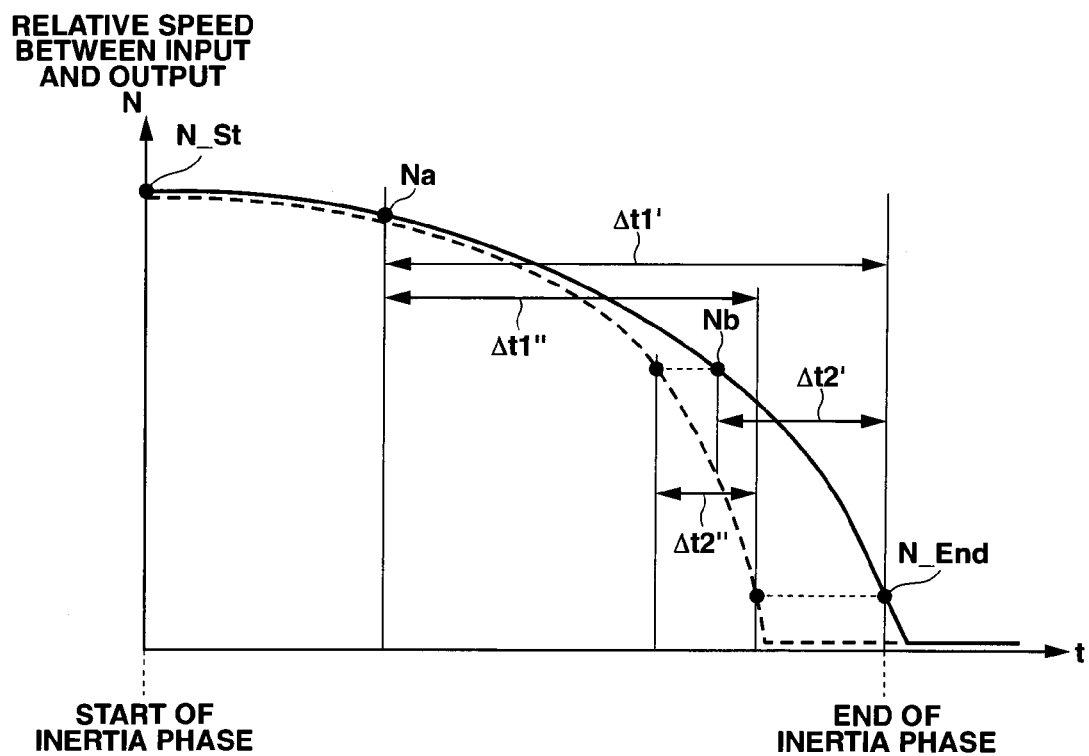
FIG. 12 is a comparative characteristic view of a relative rotational speed between input and output, and shows a way to determine an inertia-phase relative-speed period ratio $\Delta t2/\Delta t1$ which is used as a characteristic-gradient index value in the judder judging process executed by the automatic-transmission controller 20.

For example, in the first embodiment, the characteristic-gradient index-value calculating section for judging the judder calculates the inertia-phase period ratio Δt2/Δt1 between the first inertia-phase period Δt1 and second inertia-phase period Δt2, as the characteristic-gradient index value. However, the characteristic-gradient index-value calculating section may calculate an inertia-phase relative-speed period ratio Δt2/Δt1 using a relative rotational speed N between input and output of friction-engagement element in place of the actual gear ratio GR, as the characteristic-gradient index value, as shown in FIG. 12. In this modified example, a first inertia-phase relative-speed period Δt1 (corresponding to the first drive-system physical quantity) is calculated as the first time period which is a time period between a time point when the relative rotational speed N becomes equal to a first relative speed Na with the progress of the shift from the start of inertia phase and a time point when the relative rotational speed N becomes equal to an inertia-phase end relative speed N_End. Moreover, a second inertia-phase relative-speed period Δt2 (corresponding to the second drive-system physical quantity) is calculated as the second time period which is a time period between a time point when the relative rotational speed N becomes equal to a second relative speed Nb from the start of inertia phase and a time point when the relative rotational speed N becomes equal to the inertia-phase end relative speed N_End. This second relative speed Nb is a more advanced value in shift progress than the first relative speed Na. Thereby, the inertia-phase relative-speed period ratio Δt2/Δt1 between the first inertia-phase relative-speed period Δt1 and the second inertia-phase relative-speed period Δt2 is calculated and used as the characteristic-gradient index value. In this modified example, a relation: $\Delta t2'/\Delta t1' > \Delta t2''/\Delta t1''$ is satisfied, where $\Delta t2'/\Delta t1'$ denotes the inertia-phase relative-speed period ratio Δt2/Δt1 in the case where the μ-v characteristic has a positive gradient, and $\Delta t2''/\Delta t1''$ denotes the inertia-phase relative-speed period ratio Δt2/Δt1 in the case where the μ-v characteristic has a negative gradient.

Figure 13:
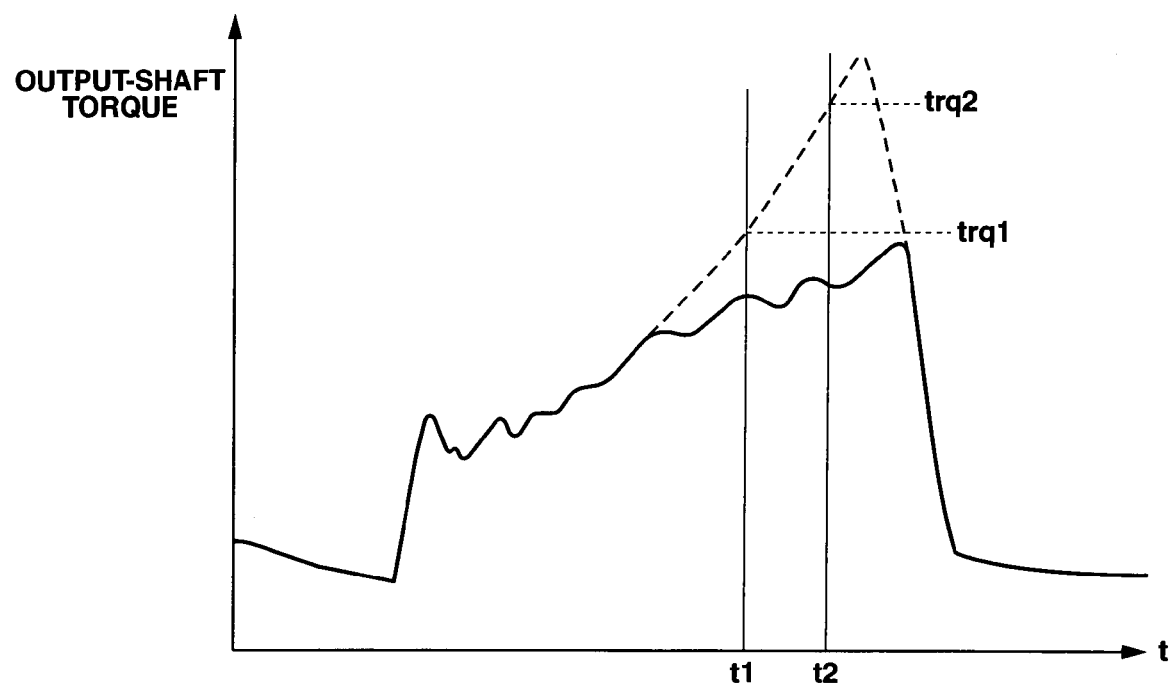
FIG. 13 is a comparative characteristic view of output-shaft torque, and shows an output-shaft torque average value T_ave and an output-shaft torque average inclination x each of which is used as the characteristic-gradient index value in the judder judging process executed by the automatic-transmission controller 20.

In the first embodiment, the inertia-phase period ratio Δt2/Δt1 is used as the characteristic-gradient index value. However, an output-shaft torque average value T_ave or an output-shaft torque average inclination x for a period (e.g., from the first time point t1 to the second time point t2) near the ending period of the inertia phase may be used as the characteristic-gradient index value, as shown in FIG. 13. A solid line of FIG. 13 shows a characteristic of the output-shaft torque during the inertia phase in the case where the μ-v characteristic has a positive gradient, and a dotted line of FIG. 13 shows a characteristic of the output-shaft torque during the inertia phase in the case where the μ-v characteristic has a negative gradient. The output-shaft torque average value T_ave in the case where the μ-v characteristic has a negative gradient takes a higher value than that in the case where the μ-v characteristic has a positive gradient. Moreover, the output-shaft torque average inclination x (=(trq2−trq1)/(t2−t1)) in the case where the μ-v characteristic has a negative gradient takes a higher value than that in the case where the μ-v characteristic has a positive gradient.

Alternatively, a gear-ratio gradient ratio (transmission-ratio gradient ratio) or a turbine rotational speed ratio may be used as the characteristic-gradient index value, in place of the above-mentioned time period ratio. Furthermore, the above-mentioned reference shifting time may be provided as a value calculated from the start time t_St of inertia phase. In sum, the characteristic-gradient index-value calculating section for judging the judder has only to do calculate the characteristic-gradient index value resulting from a quantification of the phenomenon that appears in a different way in dependence upon whether the μ-v characteristic of friction-engagement element is the positive-gradient characteristic or the negative-gradient characteristic. That is, a concrete structure of the characteristic-gradient index-value calculating section according to the present invention is not limited to the examples shown in the first embodiment and FIGS. 12 and 13.

In the first embodiment, it is judged whether the judder of engaging-side friction-engagement element has occurred or not occurred during the inertia phase of upshift. However, according to the present invention, it may be judged whether the judder of engaging-side friction-engagement element has occurred or not occurred during the inertia phase of downshift.

INDUSTRIAL APPLICABILITY

In the first embodiment, the control apparatus according to the present invention is applied to the control apparatus for the step automatic transmission having forward seven speed-ratios and reverse one speed-ratio. However, as a matter of course, the control apparatus according to the present invention is applicable to the other step automatic transmission having a plurality of forward speed-ratios.

This application is based on a prior Japanese Patent Application No. 2008-225799 filed on Sep. 3, 2008. The entire contents of this Japanese Patent Application are hereby incorporated by reference.

The scope of the invention is defined with reference to the following claims.

What is claimed is:
1. A control apparatus for an automatic transmission, comprising:
a shift control section configured to perform a shift of the automatic transmission by engaging a first friction-engagement element which is in a released state, and by releasing a second friction-engagement element which is in an engaged state; and
a judder judging section configured to judge an occurrence of a judder due to self-excited vibration;
wherein the shift control section includes an inertia-phase determining section configured to judge whether or not a progress of the shift is during an inertia phase, the inertia phase being one of phases each representing a degree of shift progress under a shift control, an input speed of the automatic transmission being varied for the inertia phase;
wherein the judder judging section is configured:
to calculate a characteristic-gradient index value, the characteristic-gradient index value being a value obtained by quantifying a phenomenon that appears as a relative rotational speed of input and output of the first friction-engagement element becomes reduced with a progress of the inertia phase, the phenomenon appearing in a different way in dependence upon whether a relational characteristic of a friction coefficient of the first friction-engagement element with respect to the relative rotational speed is a positive-gradient characteristic or a negative-gradient characteristic, and to determine that the judder has occurred, when the characteristic-gradient index value indicates that the phenomenon has appeared due to the negative-gradient characteristic.

2. The control apparatus as claimed in claim 1, wherein the judder judging section includes a characteristic-gradient index-value calculating section configured:

to specify an ending period of the inertia phase as a period for which the relative rotational speed of the first friction-engagement element approaches 0, within an inertia phase period being defined between a start and an end of the inertia phase; and to calculate a drive-system physical quantity which appears during the specified ending period of the inertia phase, as the characteristic-gradient index value.

3. The control apparatus as claimed in claim 1, wherein the judder judging section includes a characteristic-gradient index-value calculating section configured:

to specify an ending period of the inertia phase as a period for which the relative rotational speed of the first friction-engagement element approaches 0, within an inertia phase period being defined between a start and an end of the inertia phase;

to calculate a first drive-system physical quantity which appears during a period between a starting region and an ending region of the inertia phase;

to calculate a second drive-system physical quantity which appears during the specified ending period of the inertia phase; and to calculate a ratio between the first drive-system physical quantity and the second drive-system physical quantity, as the characteristic-gradient index value.

4. The control apparatus as claimed in claim 3, wherein the characteristic-gradient index-value calculating section is configured:

to define a time point when an actual transmission ratio of the automatic transmission becomes equal to an inertia-phase start determining transmission ratio, as an inertia-phase start time;

to define a time point when the actual transmission ratio becomes equal to an inertia-phase end determining transmission ratio, as an inertia-phase end time;

to calculate the first drive-system physical quantity corresponding to a first time period between a first time point and the inertia-phase end time, the first time point being a time point when the actual transmission ratio becomes equal to a first transmission ratio by the progress of the shift from the inertia-phase start time; and to calculate the second drive-system physical quantity corresponding to a second time period between a second time point and the inertia-phase end time, the second time point being a time point when the actual transmission ratio becomes equal to a second transmission ratio, the second transmission ratio being a transmission ratio value advanced from the first transmission ratio by the progress of the shift.

5. The control apparatus as claimed in claim 3, wherein the characteristic-gradient index-value calculating section is configured:

to specify each of the first drive-system physical quantity and the second drive-system physical quantity by using an elapsed time period within the inertia phase, and to calculate a ratio of a second inertia-phase period corresponding to the second drive-system physical quantity to a first inertia-phase period corresponding to the first drive-system physical quantity, as the characteristic-gradient index value; and wherein the judder judging section is configured to determine that the judder has occurred due to self-excited vibration when the ratio of the second inertia-phase period to the first inertia-phase period is lower than or equal to a judder judgment threshold value.

6. The control apparatus as claimed in claim 1, wherein the judder judging section includes a judder reduction-control executing section configured, in a case where it is determined that the judder has occurred due to self-excited vibration, to carry out a judder reduction control to shorten a shifting time of the automatic transmission when a shift having a shift mode same as that of the shift receiving the current determination of judder occurrence is conducted next after the current determination.

7. An apparatus for an automatic transmission, comprising:
a first friction-engagement element;
a second friction-engagement element; and
means for:
performing a shift of the automatic transmission by engaging the first friction-engagement element which is in a released state, and by releasing the second friction-engagement element which is in an engaged state, judging whether or not a progress of the shift is during an inertia phase, the inertia phase being one of phases each representing a degree of shift progress under a shift control, an input speed of the automatic transmission being varied for the inertia phase, calculating a characteristic-gradient index value, the characteristic-gradient index value being a value obtained by quantifying a phenomenon that appears as a relative rotational speed of input and output of the first friction-engagement element becomes reduced with a progress of the inertia phase, the phenomenon appearing in a different way in dependence upon whether a relational characteristic of a friction coefficient of the first friction-engagement element with respect to the relative rotational speed is a positive-gradient characteristic or a negative-gradient characteristic, and determining that a judder due to self-excited vibration has occurred when the characteristic-gradient index value indicates that the phenomenon has appeared due to the negative-gradient characteristic.

8. A control method for an automatic transmission, comprising:

performing a shift of transmission ratio by engaging a first friction-engagement element which is in a released state, and by releasing a second friction-engagement element which is in an engaged state; and judging an occurrence of a judder due to self-excited vibration, by operations of:
judging whether or not a progress of the shift is during an inertia phase, the inertia phase being one of phases each representing a degree of shift progress under a shift control, an input speed of the automatic transmission being varied for the inertia phase;

calculating a characteristic-gradient index value, the characteristic-gradient index value being a value obtained by quantifying a phenomenon that appears as a relative rotational speed of input and output of the first friction-engagement element becomes reduced with a progress of the inertia phase, the phenomenon appearing in a different way in dependence upon whether a relational characteristic of a friction coefficient of the first friction-engagement element with respect to the relative rotational speed is a positive-gradient characteristic or a negative-gradient characteristic; and determining that the judder has occurred when the characteristic-gradient index value indicates that the phenomenon has appeared due to the negative-gradient characteristic.

9. An apparatus for an automatic transmission, comprising:
a controller configured to perform a shift of the automatic transmission by engaging a first friction-engagement element which is in a released state, and by releasing a second friction-engagement element which is in an engaged state; and
wherein the controller is further configured to:
judge whether or not a progress of the shift is during an inertia phase, the inertia phase being one of phases each representing a degree of shift progress under a shift control, an input speed of the automatic transmission being varied for the inertia phase;
calculate a characteristic-gradient index value, the characteristic-gradient index value being a value obtained by quantifying a phenomenon that appears as a relative rotational speed of input and output of the first friction-engagement element becomes reduced with a progress of the inertia phase, the phenomenon being a function of whether a relational characteristic of a friction coefficient of the first friction-engagement element with respect to the relative rotational speed is a positive-gradient characteristic or a negative-gradient characteristic, and
determine that a judder due to self-excited vibration has occurred when the characteristic-gradient index value indicates that the phenomenon is caused by the negative-gradient characteristic.

10. The apparatus as claimed in claim 9, wherein the controller is further configured to:
specify an ending period of the inertia phase as a period for which the relative rotational speed of the first friction-engagement element approaches 0, within an inertia phase period being defined between a start and an end of the inertia phase; and
calculate a drive-system physical quantity which appears during the specified ending period of the inertia phase, as the characteristic-gradient index value.

11. The apparatus as claimed in claim 9, wherein the controller is further configured to:
specify an ending period of the inertia phase as a period for which the relative rotational speed of the first friction-engagement element approaches 0, within an inertia phase period being defined between a start and an end of the inertia phase;
calculate a first drive-system physical quantity which appears during a period between a starting region and an ending region of the inertia phase;
calculate a second drive-system physical quantity which appears during the specified ending period of the inertia phase; and
calculate a ratio between the first drive-system physical quantity and the second drive-system physical quantity, as the characteristic-gradient index value.

12. The apparatus as claimed in claim 11, wherein the controller is further configured to:
define a time point when an actual transmission ratio of the automatic transmission becomes equal to an inertia-phase start determining transmission ratio, as an inertia-phase start time;
define a time point when the actual transmission ratio becomes equal to an inertia-phase end determining transmission ratio, as an inertia-phase end time;
calculate the first drive-system physical quantity corresponding to a first time period between a first time point and the inertia-phase end time, the first time point being a time point when the actual transmission ratio becomes equal to a first transmission ratio by the progress of the shift from the inertia-phase start time; and
calculate the second drive-system physical quantity corresponding to a second time period between a second time point and the inertia-phase end time, the second time point being a time point when the actual transmission ratio becomes equal to a second transmission ratio, the second transmission ratio being a transmission ratio value advanced from the first transmission ratio by the progress of the shift.

13. The apparatus as claimed in claim 11, wherein the controller is further configured to:
specify each of the first drive-system physical quantity and the second drive-system physical quantity by using an elapsed time period within the inertia phase, and
calculate a ratio of a second inertia-phase period corresponding to the second drive-system physical quantity to a first inertia-phase period corresponding to the first drive-system physical quantity, as the characteristic-gradient index value; and
wherein the judder judging section is configured to determine that the judder has occurred due to self-excited vibration when the ratio of the second inertia-phase period to the first inertia-phase period is lower than or equal to a judder judgment threshold value.

14. The apparatus as claimed in claim 9, wherein the judder judging section includes a judder reduction-control executing section configured, in a case where it is determined that the judder has occurred due to self-excited vibration, to carry out a judder reduction control to shorten a shifting time of the automatic transmission when a shift having a shift mode same as that of the shift receiving the current determination of judder occurrence is conducted next after the current determination.

15. The apparatus as claimed in claim 9, further comprising the first friction-engagement element and the second friction-engagement element.

* * * * *